US008375460B2

(12) United States Patent
Liang et al.

(10) Patent No.: US 8,375,460 B2
(45) Date of Patent: Feb. 12, 2013

(54) ELECTRONIC DEVICE AND METHOD OF PROTECTING SOFTWARE

(75) Inventors: Hsien-Chuan Liang, Taipei Hsien (TW); Shen-Chun Li, Taipei Hsien (TW); Shou-Kuo Hsu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 281 days.

(21) Appl. No.: 12/854,909

(22) Filed: Aug. 12, 2010

(65) Prior Publication Data
US 2011/0247085 A1 Oct. 6, 2011

(30) Foreign Application Priority Data

Mar. 30, 2010 (TW) .................. 99109746 A

(51) Int. Cl.
*G06F 7/04* (2006.01)
*G06F 17/30* (2006.01)
(52) U.S. Cl. ............... 726/30; 726/27; 726/28; 726/29; 726/4; 713/168; 713/172; 717/177; 717/140; 705/59
(58) Field of Classification Search ............. 726/16–19, 726/26, 27–30, 4; 713/161, 194
See application file for complete search history.

(56) References Cited

U.S. PATENT DOCUMENTS

| 6,615,191 | B1* | 9/2003 | Seeley ............................ 705/54 |
| 7,133,917 | B2* | 11/2006 | Re et al. ........................ 709/224 |
| 7,503,072 | B2* | 3/2009 | Hughes et al. ................. 726/26 |
| 7,752,139 | B2* | 7/2010 | Hu ................................... 705/59 |
| 7,765,600 | B2* | 7/2010 | Saunders et al. ................ 726/27 |
| 7,814,023 | B1* | 10/2010 | Rao et al. ......................... 705/59 |
| 8,181,262 | B2* | 5/2012 | Cooper et al. .................. 726/28 |
| 2002/0091645 | A1* | 7/2002 | Tohyama ........................ 705/59 |
| 2004/0059938 | A1* | 3/2004 | Hughes et al. ................. 713/200 |
| 2005/0251488 | A1* | 11/2005 | Saunders et al. ................ 705/59 |
| 2008/0073325 | A1* | 3/2008 | Poe .................................. 216/97 |
| 2008/0092239 | A1* | 4/2008 | Sitrick et al. .................... 726/27 |
| 2008/0244754 | A1* | 10/2008 | Curren ............................ 726/27 |
| 2010/0031324 | A1* | 2/2010 | Strich et al. ...................... 726/4 |
| 2010/0306773 | A1* | 12/2010 | Lee et al. .......................... 718/1 |
| 2011/0061047 | A1* | 3/2011 | Tyamagondlu et al. ...... 717/177 |

OTHER PUBLICATIONS

Sinnott, RO, Secure, Performance-Oriented Data Management for nanoCMOS Electronics, Dec. 2008, IEEE, Edition 4, pp. 4-7.*

* cited by examiner

*Primary Examiner* — Nathan Flynn
*Assistant Examiner* — Viral Lakhia
(74) *Attorney, Agent, or Firm* — Altis Law Group, Inc.

(57) ABSTRACT

In an electronic device and method of protecting software, a software program of the electronic device is invoked. The media access control (MAC) address of the electronic device and a serial number of a hard disk drive that stores the software program in the electronic device are searched. The MAC address and the serial number are compared with MAC addresses and serial numbers included in the software program, to determinate whether it is licensed to run the software program in the electronic device. Usage logs of the software program are further obtained to determine whether running of the software program in the electronic device is expired.

19 Claims, 3 Drawing Sheets

ELECTRONIC DEVICE AND METHOD OF PROTECTING SOFTWARE

BACKGROUND

1. Technical Field

Embodiments of the present disclosure generally relate to software protection technique, and more specifically to a system and method of protecting software program from unlicensed usage.

2. Description of Related Art

Growing use of computers has resulted in extensive unlicensed use and pirated copying of computer software. This deprives the proprietor of the software from legitimate income from the sale of licenses. Thus, protection arrangements are necessary for software to prevent unlicensed use of commercial software.

Originally, there are three suggested mechanisms for the protection of software against unlicensed use. The first protection mechanism is simply a contract between the software proprietor and user where misuse creates rights for the recovery of damages or specific penalties for misuse. The second protection mechanism is the display of the licensee's name or other unique information on a CRT screen or printout which publicizes the terms of the license, and to some extent provides a deterrent against use by users other than a licensee. The third protection mechanism is applicable to cases where a program is to be run on a computer into which is incorporated a unique identification number. Thus, a software manufacturer may incorporate into its software product instructions that the product can only be employed with a computer bearing that unique identification number.

While the first two protection mechanisms offer some protection against the illegal resale of software products, they generally do not prevent the sharing of licensed products among users. Furthermore, with respect to the first protection mechanism, it may not be effective at all in countries where procedural or substantive law prevents the enforcement of a particular contract.

The second and third protection mechanisms suffer from the requirement that software distribution must be customized for each user, which may seem simple, but has proved to be logistically difficult in practice.

The third protection mechanism is perhaps the most effective one, and for computers which can read out identification numbers, it can be implemented in a standardized fashion. However, most computers do not contain built-in identifications which can be read by a program. In such cases, special purpose identification devices must be supplied. Unfortunately, there are no standards for such devices, and the use of a different identification device for each product is unwieldy and generally leads to incompatibility when more than one such product is to be used in the same computer. Also, simple hardware identification readouts are easy to defeat.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
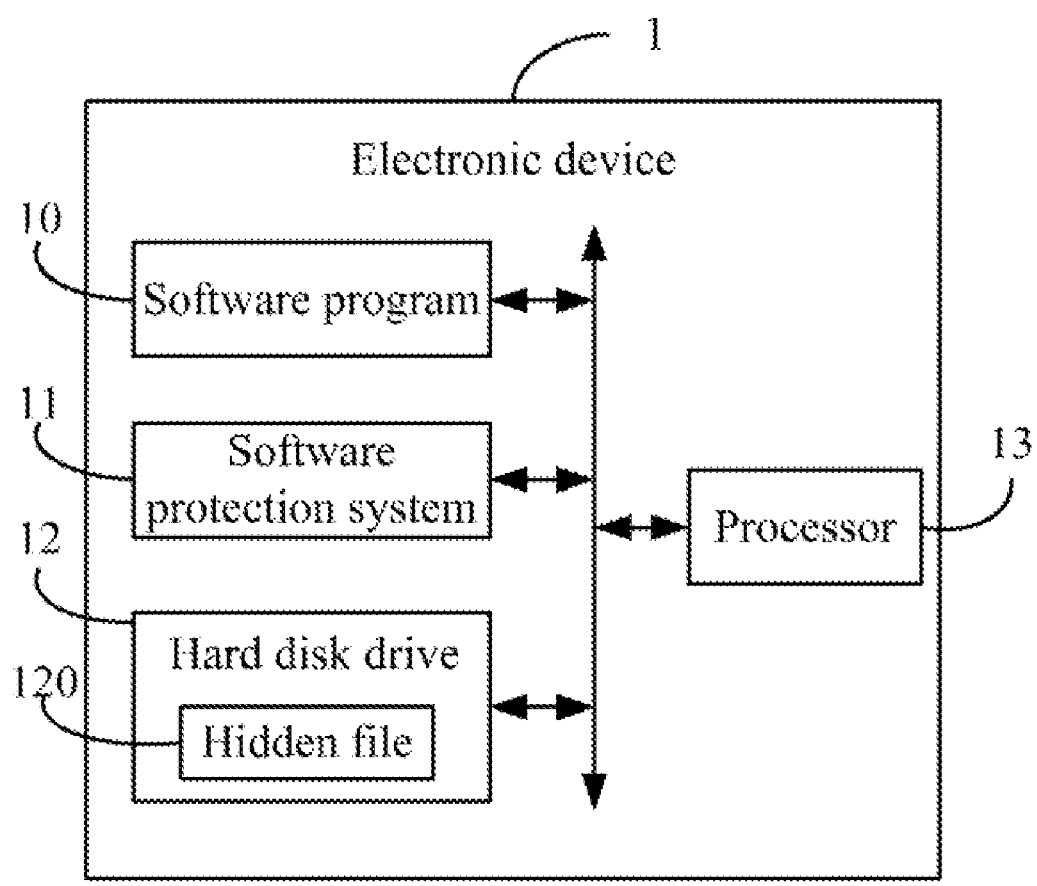
FIG. 1 is a block diagram of one embodiment of an electronic device including a software protection system.

FIG. 1 is a block diagram of one embodiment of an electronic device 1 including a software protection system 11. The electronic device 1 may be a computer, an application server, and/or a mobile phone, for example. In one embodiment, the electronic device 1 includes a software program 10, the software protection system 11, a hard disk drive 12, and a processor 13. The software program 10 may be any commercial software. In one embodiment, the software program 10 includes information of media access control (MAC) address of electronic devices that are licensed to run the software program 10 and information of serial numbers of hard disk drives that are licensed to store the software program 10.

The software protection system 11 includes a plurality of function modules (described with reference to FIG. 2), to protect the software program 10 from unlicensed usage. The hard disk drive 12 includes a file 120 operable to record usage logs of the software program 10. In one embodiment, the usage logs of the software program 10 include a last run time of the software program 10, a number of times the software program 10 has been run in the electronic device 1, a licensed period and a maximum license usage of the software program 10. For example, the file 120 may record that the last run time of the software program 10 is 12:00 on Jul. 1, 2010, the software program 10 has been run 10 times, the licensed period of the software program 10 is from Jan. 1, 2010 to Dec. 31, 2010, and the maximum license usage of the software program 10 is 50 times. In one embodiment, the file 120 is hidden in the hard disk drive 12.

Furthermore, The hard disk drive 12 stores one or more computerized codes of the functional modules of the software protection system 11. The processor 13 can execute the one or more computerized codes of the functional modules of the software protection system 11.

Figure 2:
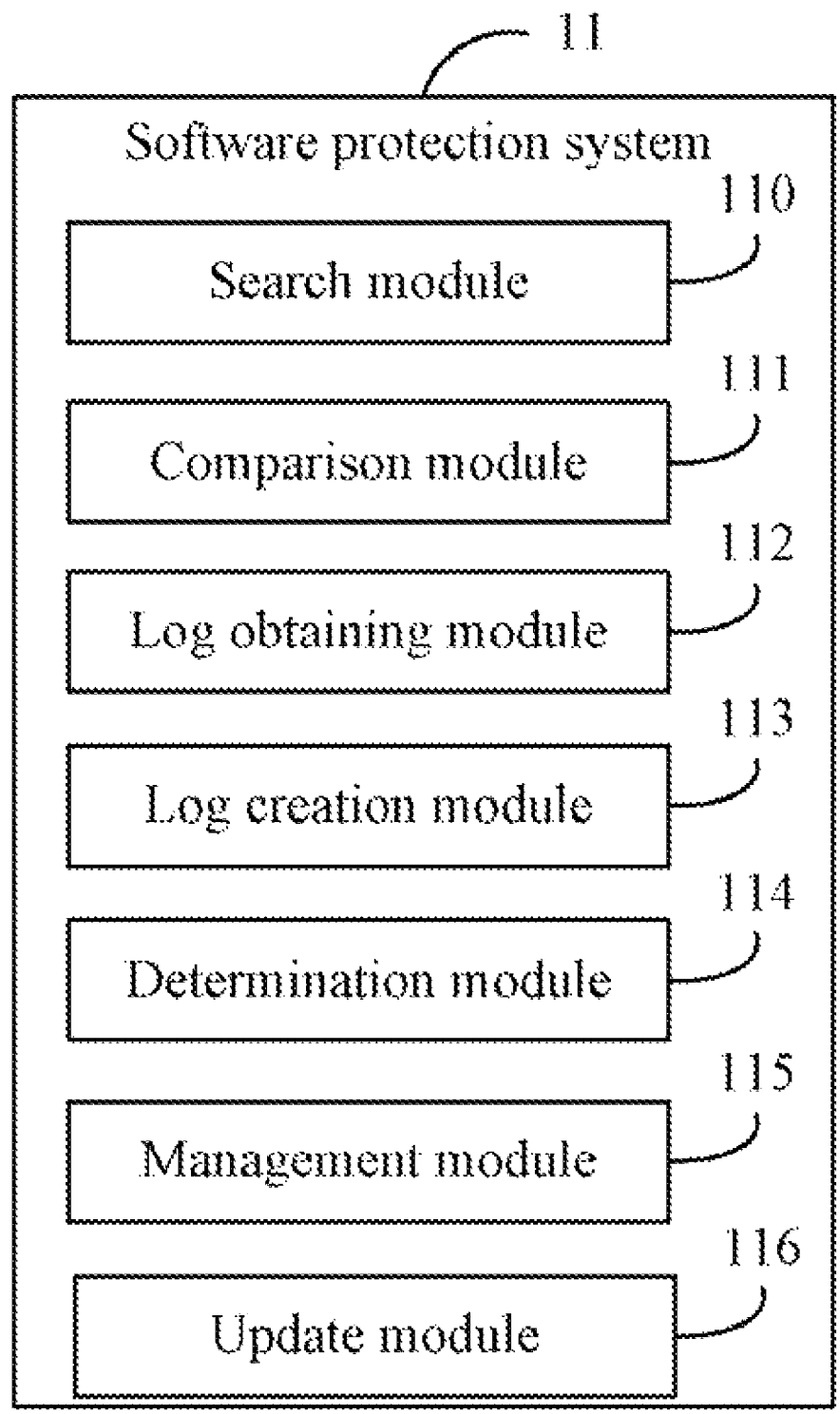
FIG. 2 is a block diagram of functional modules of the software protection system in FIG. 1.

FIG. 2 is a block diagram of functional modules of the software protection system 11. In one embodiment, the software protection system 11 includes a search module 110, a comparison module 111, a log obtaining module 112, a log creation module 113, a determination module 114, a management module 115, and an update module 116.

The search module 110 searches for the MAC address of the electronic device 1, and further searches for a serial number of the hard disk drive 12. In the present embodiment, the electronic device 1 may be a computer or an application server, for example.

The comparison module 111 compares the MAC address of the electronic device 1 and the serial number of the hard disk drive 12 with the information included in the software program 10 to determine whether the software program 10 is licensed to run in the electronic device 1. As mentioned above, the information included in the software program 10 are the MAC addresses of electronic devices that are licensed to run the software program 10, and the serial numbers of hard disk drives that are licensed to store the software program 10. In one embodiment, the comparison module 111 determines that the software program 10 is licensed to run in the electronic device 1 if the MAC address of the electronic device 1 and the serial number of the hard disk drive 12 match the information included in the software program 10. That is, both the MAC address of the electronic device 1 and the serial number of the hard disk drive 12 are recorded in the software program 10.

The log obtaining module 112 determines whether there are the usage logs of the software program 10 in the file 120 if the software program 10 is licensed to run in the electronic device 1, and obtains the usage logs from the file 120. As mentioned above, the usage logs of the software program 10 include a last run time of the software program 10, a number of times the software program 10 has been run in the electronic device 1, a licensed period and a maximum license usage of the software program 10.

The log creation module 113 creates the usage logs of the software program 10 when the software program 10 is running in the electronic device 1, if there are no the usage logs in the file 120, and records the usage logs into the file 120.

The determination module 114 determines if the last run time of the software program 10 is earlier than the current system time of the electronic device 1, for checking whether the current system time of the electronic device 1 has been hacked, determines if the current system time of the electronic device 1 is within the licensed period of the software program 10 if the current system time of the electronic device 1 has not been hacked, and determines if the number of times the software program 10 has been run in the electronic device 1 is less than the maximum licensed usage of the software program 10. It may be understood that, the above determinations are for checking whether running of the software program in the electronic device is expired.

The management module 115 permits the software program 10 to run in the electronic device 1 if the last run time of the software program 10 is earlier than the current system time of the electronic device 1, the current system time of the electronic device 1 is within the licensed period of the software program 10, and the number of times the software program 10 has been run is less than the maximum licensed usage of the software program 10. Otherwise, the management module 115 denies the usage of the software program 10 in the electronic device 1 if the last run time of the software program 10 is later than the current system time of the electronic device 1, or the current system time of the electronic device 1 is past the licensed period of the software program 10, or the number of times the software program 10 has been run exceeds the maximum licensed usage of the software program 10.

The update module 116 updates the last run time of the software program 10 and the number of times the software program 10 has been run in the usage logs if the software program 10 is permitted to run in the electronic device 1.

Figure 3:
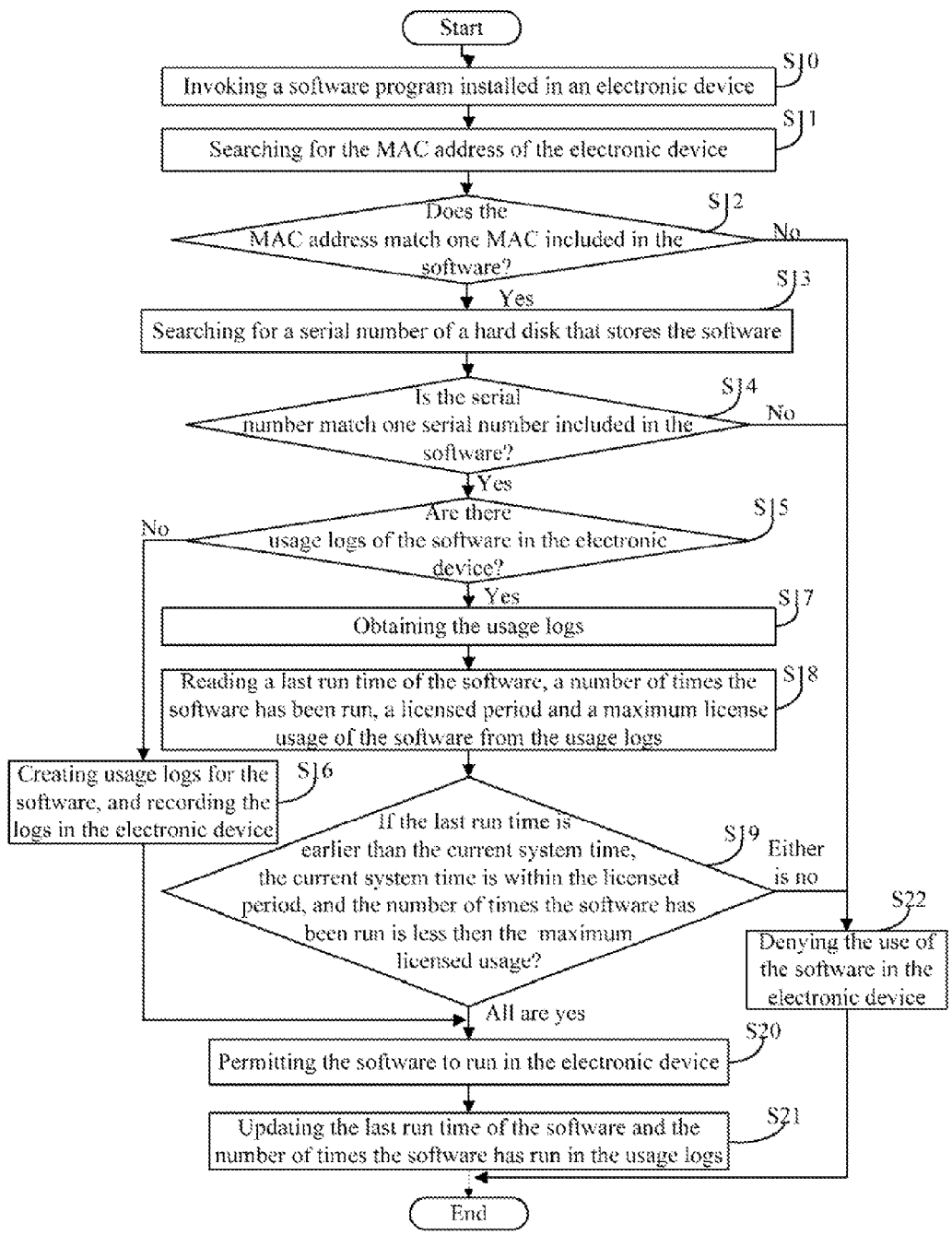
FIG. 3 is a flowchart of one embodiment of a method of protecting software.

FIG. 3 is a flowchart of one embodiment of a method of protecting software. The method can be performed by execution of a computer-readable program code by at least one processor 13 of the electronic device 1 shown in FIG. 1. Depending on the embodiment, additional blocks in the flowchart of FIG. 3 may be added, others removed, and the ordering of the blocks may be changed.

In block S10, software program 10 installed in the electronic device 1 is invoked. In one embodiment, the software program 10 includes information of media access control (MAC) addresses of electronic devices that are licensed to run the software program 10, and information of serial numbers of hard disk drives that are licensed to store the software program 10. The electronic device 1 may be a computer or an application server, for example.

In block S11, the search module 110 searches for the MAC address of the electronic device 1.

In block S12, the comparison module 111 determines if the MAC address of the electronic device 1 matches one MAC address included in the software program 10 by comparison. If the MAC address of the electronic device 1 does not match one MAC address included in the software program 10, the procedure goes to block S22, the management module 115 denies the usage of the software program 10 in the electronic device 1. Then, the procedure ends. Otherwise, block S13 is implemented if the MAC address of the electronic device 1 matches one MAC address included in the software program 10.

In block S13, the search module 110 further searches for a serial number of a hard disk drive 12 that stores the software program 10 in the electronic device 1.

In block S14, the comparison module 111 determines if the serial number of the hard disk drive 12 matches one serial number included in the software program 10 by comparison. If the serial number of the hard disk drive 12 does not match one serial number included in the software program 10, the procedure goes to block S22, the management module 115 denies the usage of the software program 10 in the electronic device 1. Then, the procedure ends. Otherwise, block S15 is implemented if the serial number of the hard disk drive 12 matches one serial number included in the software program 10.

In block S15, the log obtaining module 112 determines whether there are the usage logs of the software program 10 in the file 120 of the hard disk drive 12. As mentioned above, the usage logs of the software program 10 include a last run time of the software program 10, a number of times the software program 10 has been run in the electronic device 1, a licensed period and a maximum license usage of the software program 10. If there are no the usage logs of the software program 10 in the file 120, the procedure goes to block S16, the log creation module 113 creates the usage logs for the software program 10, and records the usage logs in the file 120. Then, the procedure goes to block S21. Otherwise, block S17 is implemented if there are the usage logs of the software program 10 in the file 120.

In block S17, the log obtaining module 112 obtains the usage logs from the file 120.

In block S18, the log obtaining module 112 reads the last run time of the software program 10, the number of times the software program 10 has been run in the electronic device 1, the licensed period and the maximum license usage of the software program 10 from the usage logs.

In block S19, the determination module 114 determines if the last run time of the software program 10 is earlier than the current system time of the electronic device 1, for checking whether the current system time of the electronic device 1 has been hacked, determines if the current system time of the electronic device 1 is within the licensed period of the software program 10 if the current system time of the electronic device 1 has not been hacked, and determines if the number of times the software program 10 has been run in the electronic device 1 is less than the maximum licensed usage of the software program 10. If either answer of the above determinations is no, it means running of the software program in the electronic device is expired, then, the procedure goes to block S22, the management module 115 denies usage of the software program 10 in the electronic device 1. Then, the procedure ends. Otherwise, block S20 is implemented is all answers of the above determinations are yes.

In block S20, the management module 115 permits the software program 10 to run in electronic device 1.

In block S21, the update module 116 updates the last run time of the software program 10 and the number of times the software program 10 has been run in the usage logs.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized software protection method, the method being performed in an electronic device and comprising:
    (a) invoking a software program of the electronic device, wherein the software program includes information of one or more media access control (MAC) addresses of electronic devices, and one or more serial numbers of hard disk drives;
    (b) searching for a MAC address of the electronic device;
    (c) determining whether the MAC address of the electronic device matches one of the MAC addresses that are included in the software program;
    (d) searching for a serial number of a hard disk drive that stores the software program in the electronic device upon the condition that the MAC address of the electronic device matches one of the MAC addresses included in the software program;
    (e) determining whether the serial number of the hard disk drive matches one of the serial numbers that are included in the software program;
    (f) obtaining usage logs of the software program from a file of the hard disk drive upon the condition that the serial number of the hard disk drive matches one of the serial numbers included in the software program, wherein the usage logs comprise a last run time of the software program; and
    (g) permitting the software program to run in the electronic device or denying usage of the software program in the electronic device according to a comparison of the last run time and a current system time of the electronic device.

2. The method as described in claim 1, wherein the usage logs of the software program further comprise a number of times the software program has been run in the electronic device, a licensed period and a maximum license usage of the software program.

3. The method as described in claim 2, wherein step (g) comprises:
    permitting the software program to run in the electronic device further according to determinations that the current system time of the electronic device is within the licensed period of the software program and the number of times the software program has been run is less than the maximum licensed usage of the software program; and
    denying usage of the software program in the electronic device further according to a determination that the MAC address of the electronic device does not match one of the MAC addresses that are included in the software program, or the serial number of the hard disk drive does not match one of the serial numbers that are included in the software program, or the current system time of the electronic device is past the licensed period of the software program, or the number of times the software program has been run exceeds the maximum licensed usage of the software program.

4. The method as described in claim 1, further comprising:
    creating the usage logs of the software program upon the condition that there are none in the file of the hard disk drive, and recording the usage logs in the file.

5. The method as described in claim 4, wherein the file is a hidden file in the hard disk drive.

6. The method as described in claim 2, after step (g) the method further comprising:
    updating the last run time of the software program and the number of times the software program has been run in the usage logs.

7. A non-transitory storage medium having stored thereon instructions that, when executed by at least one processor of an electronic device, cause the electronic device to perform a method of protecting software, the method being performed in the electronic device and comprising:
    (a) invoking a software program installed in the electronic device, wherein the software program includes information of one or more media access control (MAC) addresses of electronic devices and one or more serial numbers of hard disk drives;
    (b) searching for a MAC address of the electronic device;
    (c) determining whether the MAC address of the electronic device matches one of the MAC addresses that are included in the software program;
    (d) searching for a serial number of a hard disk drive that stores the software program in the electronic device upon the condition that the MAC address of the electronic device matches one of the MAC addresses included in the software program;
    (e) determining whether the serial number of the hard disk drive matches one of the serial numbers that are included in the software program;
    (f) obtaining usage logs of the software program from a file of the hard disk drive upon the condition that the serial number of the hard disk drive matches one of the serial numbers included in the software program, wherein the usage logs comprise a last run time of the software program; and
    (g) permitting the software program to run in the electronic device or denying usage of the software program in the electronic device according to a comparison of the last run time and a current system time of the electronic device.

8. The non-transitory storage medium as described in claim 7, wherein the usage logs of the software program further comprise a number of times the software program has been run in the electronic device, a licensed period and a maximum license usage of the software program.

9. The non-transitory storage medium as described in claim 8, wherein step (g) comprises:
    permitting the software program to run in the electronic device further according to determinations that the current system time of the electronic device is within the licensed period of the software program and the number of times the software program has been run is less than the maximum licensed usage of the software program; and
    denying usage of the software program in the electronic device further according to a determination that the MAC address of the electronic device does not match one of the MAC addresses that are included in the software program, or the serial number of the hard disk drive does not match one of the serial numbers that are included in the software program, or the current system time of the electronic device is past the licensed period of the software program, or the number of times the software program has been run exceeds the maximum licensed usage of the software program.

10. The non-transitory storage medium as described in claim 7, further comprising:
creating the usage logs of the software program upon the condition that there are none in the file of the hard disk drive, and recording the usage logs in the file.

11. The non-transitory storage medium as described in claim 10, wherein the file is a hidden file in the hard disk drive.

12. The non-transitory storage medium as described in claim 8, after step (g) the method further comprising:
updating the last run time of the software program and the number of times the software program has been run in the usage logs.

13. An electronic device of protecting software, the electronic device installed with at least one software program, wherein the software program includes information of one or more media access control (MAC) addresses and information of one or more serial numbers, the electronic device internally comprising:
a search module operable to search for a MAC address of the electronic device, and further searches for a serial number of a hard disk drive that stores the software program in the electronic device;
a comparison module operable to compare the MAC address of the electronic device and the serial number of the hard disk drive with the information included in the software program to determinate if it is licensed to run the software program in the electronic device;
a log obtaining module operable to obtain usage logs of the software program from a file of the hard disk drive in the electronic device upon the condition that it is licensed to run the software program in the electronic device, wherein the usage logs comprise a last run time of the software program, a number of times the software program has been run in the electronic device, a licensed period and a maximum license usage of the software program;
a determination module operable to determine if the last run time of the software program is earlier than the current system time of the electronic device, determines if the current system time of the electronic device is within the licensed period of the software program, and determines if the number of times the software program has been run is less than the maximum licensed usage of the software program;
a management module operable to permit the software program to run in the electronic device, or deny usage of the software program in the electronic device according to the determination results; and
a processor that executes the search module, the comparison module, the log obtaining module, the determination module, and the management module.

14. The electronic device as described in claim 13, wherein:
the management module permits the software program to run in the electronic device upon the condition that the last run time of the software program is earlier than the current system time of the electronic device, the current system time of the electronic device is within the licensed period of the software program, and the number of times the software program has been run is less than the maximum licensed usage of the software program; and
the management module denies usage of the software program in the electronic device upon the condition that running the software program in the electronic device is unlicensed, or the last run time of the software program is later than the current system time of the electronic device, or the current system time of the electronic device is past the licensed period of the software program, or the number of times the software program has been run exceeds the maximum licensed usage of the software program.

15. The electronic device as described in claim 13, wherein the electronic device is a computer or an application server.

16. The electronic device as described in claim 13, further comprising:
a log creation module operable to create the usage logs of the software program upon the condition that there are none in the file of the hard disk drive, and recording the usage logs in the file.

17. The electronic device as described in claim 16, wherein the log creation module further operable to update the last run time of the software program and the number of times the software program has been run in the usage logs after permitting the software program to run in the electronic device.

18. The electronic device as described in claim 13, wherein the file is a hidden file in the hard disk drive.

19. The electronic device as described in claim 13, wherein:
the comparison module determines that it is licensed to run the software program in the electronic device upon the condition that the MAC address of the electronic device matches one of the MAC addresses included in the software program, and the serial number of the hard disk drive matches one of the serial numbers included in the software program; and
the comparison module determines that it is unlicensed to run the software program in the electronic device upon the condition that the MAC address of the electronic device does not match one of the MAC addresses included in the software program, or the serial number of the hard disk drive does not match one of the serial numbers included in the software program.

* * * * *